US009332587B2

(12) United States Patent
Salahshoor

(10) Patent No.: US 9,332,587 B2
(45) Date of Patent: May 3, 2016

(54) SMART PROXIMITY PRIORITY PAIRING

(75) Inventor: Mohamad Reza Salahshoor, Raleigh, NC (US)

(73) Assignee: BlackBerry Limited, Waterloo, Ontario (CA)

( * ) Notice: Subject to any disclaimer, the term of this patent is extended or adjusted under 35 U.S.C. 154(b) by 104 days.

(21) Appl. No.: 13/590,299

(22) Filed: Aug. 21, 2012

(65) Prior Publication Data
US 2014/0057563 A1    Feb. 27, 2014

(51) Int. Cl.
*H04W 84/20* (2009.01)
*H04B 5/00* (2006.01)

(52) U.S. Cl.
CPC ............. *H04W 84/20* (2013.01); *H04B 5/0025* (2013.01)

(58) Field of Classification Search
CPC ............. H04B 5/02; H04B 5/00; H04B 7/00; H04W 84/20
USPC ................. 455/41.1, 41.2, 41.3; 370/328, 338
See application file for complete search history.

(56) References Cited

U.S. PATENT DOCUMENTS

| 6,975,613 | B1 * | 12/2005 | Johansson ............... 370/338 |
| 7,206,559 | B2 * | 4/2007 | Meade, II ............... 455/151.1 |
| 7,359,950 | B2 * | 4/2008 | Choi et al. ............... 709/209 |
| 7,412,251 | B2 * | 8/2008 | Lee et al. ............... 455/520 |
| 8,295,766 | B2 * | 10/2012 | Zimbric et al. ............... 455/41.2 |
| 2002/0123325 | A1 * | 9/2002 | Cooper ............... 455/411 |
| 2007/0206829 | A1 * | 9/2007 | Weinans et al. ............... 381/370 |
| 2008/0254751 | A1 | 10/2008 | Lazaridis |
| 2009/0203319 | A1 | 8/2009 | Sandoval et al. |
| 2011/0250920 | A1 * | 10/2011 | Shimizu et al. ............... 455/512 |
| 2012/0015604 | A1 * | 1/2012 | Abratowski et al. ............... 455/41.2 |
| 2012/0289158 | A1 * | 11/2012 | Palin et al. ............... 455/41.2 |

OTHER PUBLICATIONS

European Search Report, EP12181267.1, Jun. 24, 2013.

* cited by examiner

*Primary Examiner* — Lewis West
*Assistant Examiner* — Dong-Chang Shiue
(74) *Attorney, Agent, or Firm* — Thomas Grzesik; Fleit Gibbons Gutman Bongini & Bianco P.L.

(57) ABSTRACT

A method for overriding a pairing priority for a slave device connected to a master device, or for connecting a new slave device to the master device and setting a new pairing priority relative to an existing paired slave device over a short-range wireless connection such as Bluetooth®. The method includes executing an application and setting a connection priority override on either the slave device or the master device. When a connection between the slave device and master device is requested and negotiated, a priority override is communicated to the master device or queried on the master device, and if the priority override is higher than an existing priority, a connection for that device is completed with the master device, and additional slave devices in a list of last paired devices is adjusted by the master device.

25 Claims, 4 Drawing Sheets

SMART PROXIMITY PRIORITY PAIRING

FIELD OF THE DISCLOSURE

The present disclosure relates generally to wireless short range communications, and more particularly, to a methodology for negotiating pairing priority for a plurality of Bluetooth® enabled devices predicated on user-specified settings.

BACKGROUND

Typical mobile communications devices, such as smart phones, tablets and the like, are configured for voice and data communications over networks, and to execute a variety of applications in such regard. These applications may include, but are not limited to, the following functions: phone, media player, mapping, calendar, email, instant messaging (IM), text messaging (e.g., for sending and receiving short message service (SMS)/multimedia message (MMS) messages), among others.

Short-range wireless connectivity standards/technologies enable users to communicatively couple a wide range of devices without the need for physical connectivity. Such expedients provide a high speed mobile connection for the communication of voice and data. Standards include Bluetooth®, Ultra-Wideband (UWB), IrDA, ZigBee, WiFi (802.11), and the like.

Bluetooth provides a "piconet" or Personal Area Network (PAN) than provides connectivity between a roaster device and a plurality of slave devices, such as for mobile phones, keyboards, headsets, and other peripherals. In automotive applications, Bluetooth® is widely deployed to provide a "hands-free" environment while driving.

Typically, a car Bluetooth® system provides a pairing priority based on temporal pairing, Thus, if several passengers carrying phones that have been previously paired to the car system enter the vehicle at the same time, the system will assign a priority rank based on the most recently paired phone. If the number of available pairing slots is, for example, limited to 3 devices where no additional pairing slot is available, then the latest paired phone erases the lowest, priority and downwardly adjusts the remaining pairing slots to a lower priority. This arrangement has obvious limitations.

DETAILED DESCRIPTION

Figure 1:
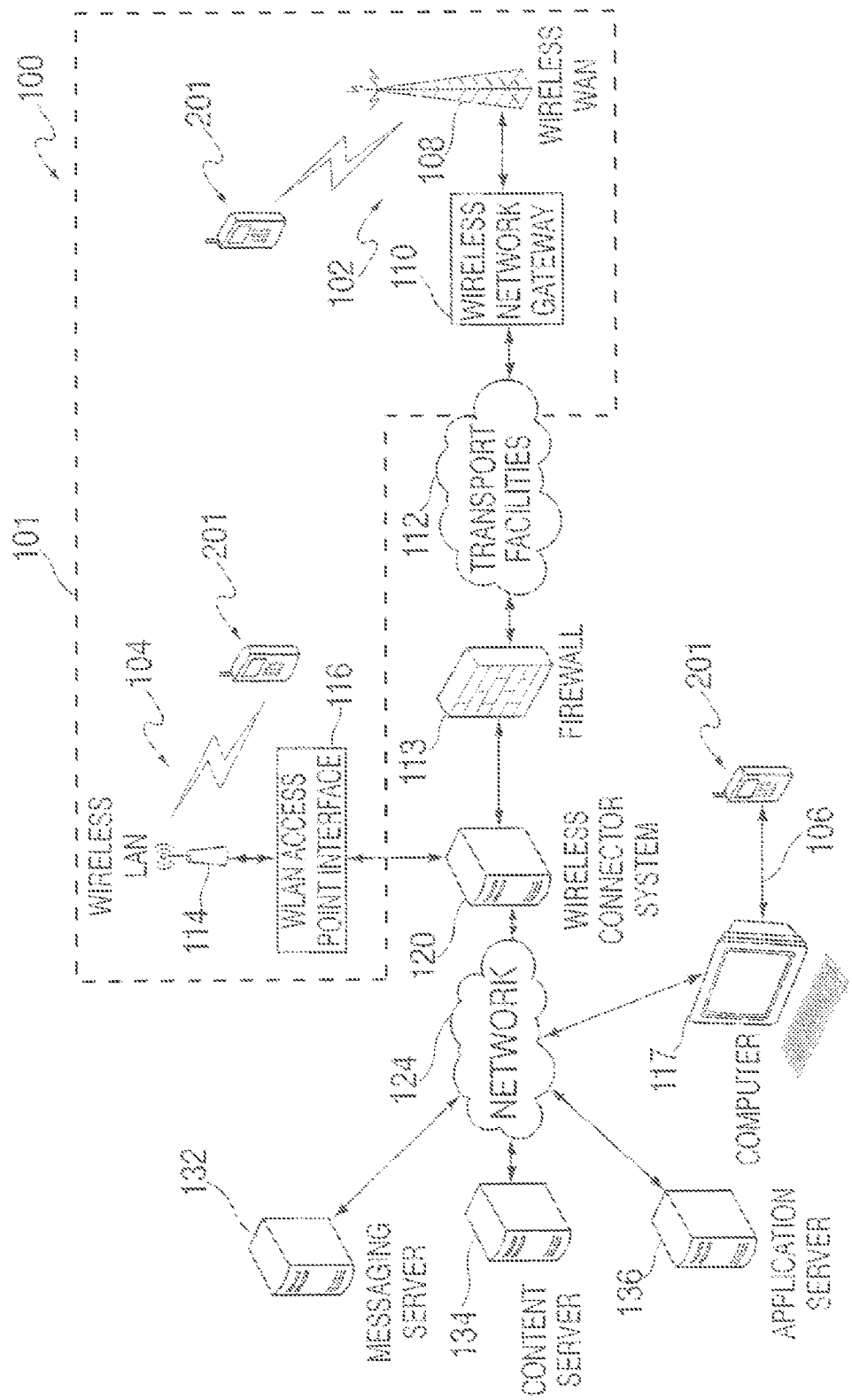
FIG. 1 is a block diagram Illustrating a communication system including a mobile communication device to which example embodiments of the present disclosure can be applied.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components hove not been described in detail to avoid obscuring the disclosed embodiments. The description is not to be considered as limited to the scope of the embodiments shown and described herein.

The embodiments described herein generally relate to portable electronic devices. Examples of portable electronic devices include mobile (wireless) communication devices such as pagers, cellular phones, Global Positioning System (GPS) navigation devices and other satellite navigation devices, smartphones, wireless organizers, personal digital assistants and wireless-enabled notebook computers. These examples are intended to be non-limiting.

In accordance with an aspect of the disclosure, a method (and device(s) so configured) is disclosed for overriding a pairing priority for a slave device connected to a master device over a short-range wireless connection such as Bluetooth®. The method includes executing an application and setting a connection priority override on either the slave device or the master device. When a connection between the slave device and master device is requested and negotiated, a priority override is communicated to the master device or queried on the master device, and if the priority override is higher than an existing priority, a connection for that device is completed with the master device, and additional slave devices in a list of last paired devices is adjusted by the master device.

In order to facilitate an understanding of one possible environment for implementing illustrative embodiments of the disclosure, reference is made to FIG. 1, which depicts a block diagram of an exemplary communication system 100. The communication system 100 comprises a plurality of mobile communication devices 201 which may be networked within system 100. In this regard, several instances of mobile communication devices 201 are depicted in FIG. 1 employing different network connections within system 100. Mobile communication devices 201 are connected to a wireless network 101 which may comprise one or more of a Wireless Wide Area Network (WWAN) 201 and a Wireless Local Area Network (WLAN) 104 or other suitable network arrangements. In some embodiments, the mobile communication devices 201 are configured to communicate over both the WWAN 201 and WLAN 104, and to roam between these networks. In some embodiments, the wireless network 101 may comprise multiple WWANs 201 and WLANs 104.

The WWAN 201 may be implemented as any suitable wireless access network technology. By way of example, but not limitation, the WWAN 201 may be implemented as a wireless network that includes a number of transceiver base stations 108 (one of which is shown in FIG. 1) where each of the base stations 108 provides wireless Radio Frequency (RF) coverage to a corresponding area or cell. The WWAN 201 is typically operated by a mobile network service provider that provides subscription packages to users of the mobile communication devices 201. In some embodiments, the WWAN 201 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 201 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 201 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the Internet rather than an internal or enterprise network.

The wireless network gateway 110 provides an interface between the wireless connector system 120 and the WWAN 201, which facilitates communication between the mobile communication devices 201 and other devices (not shown) connected, directly or indirectly, to the WWAN 201. Accordingly, communications sent via the mobile communication devices 201 are transported via the WWAN 201 and the wireless network gateway 110 through transport facilities 112 to the wireless connector system 120. Communications sent from the wireless connector system 120 are received by the wireless network gateway 110 and transported via the WWAN 201 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AF) 114 (one of which is shown in FIG. 1) that collectively provide a WLAN coverage area.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line if FIG. 1 via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 201 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range range wireless communication interface may comprise one or a combination of an infrared (IR) connection such as an Infrared Data Association (IrDA) connection, a short-range radio frequency (RF) connection such as one specified by IEEE 802.15.1 or the Bluetooth® special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teaching of the present disclosure may be employed in connection with any other type of network and associated devices that are effective in implementing or facilitating wireless communication. Suitable variations of the communication system will be understood to a person of skill in the art and are intended to fall within the scope of the present disclosure.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Figure 2:
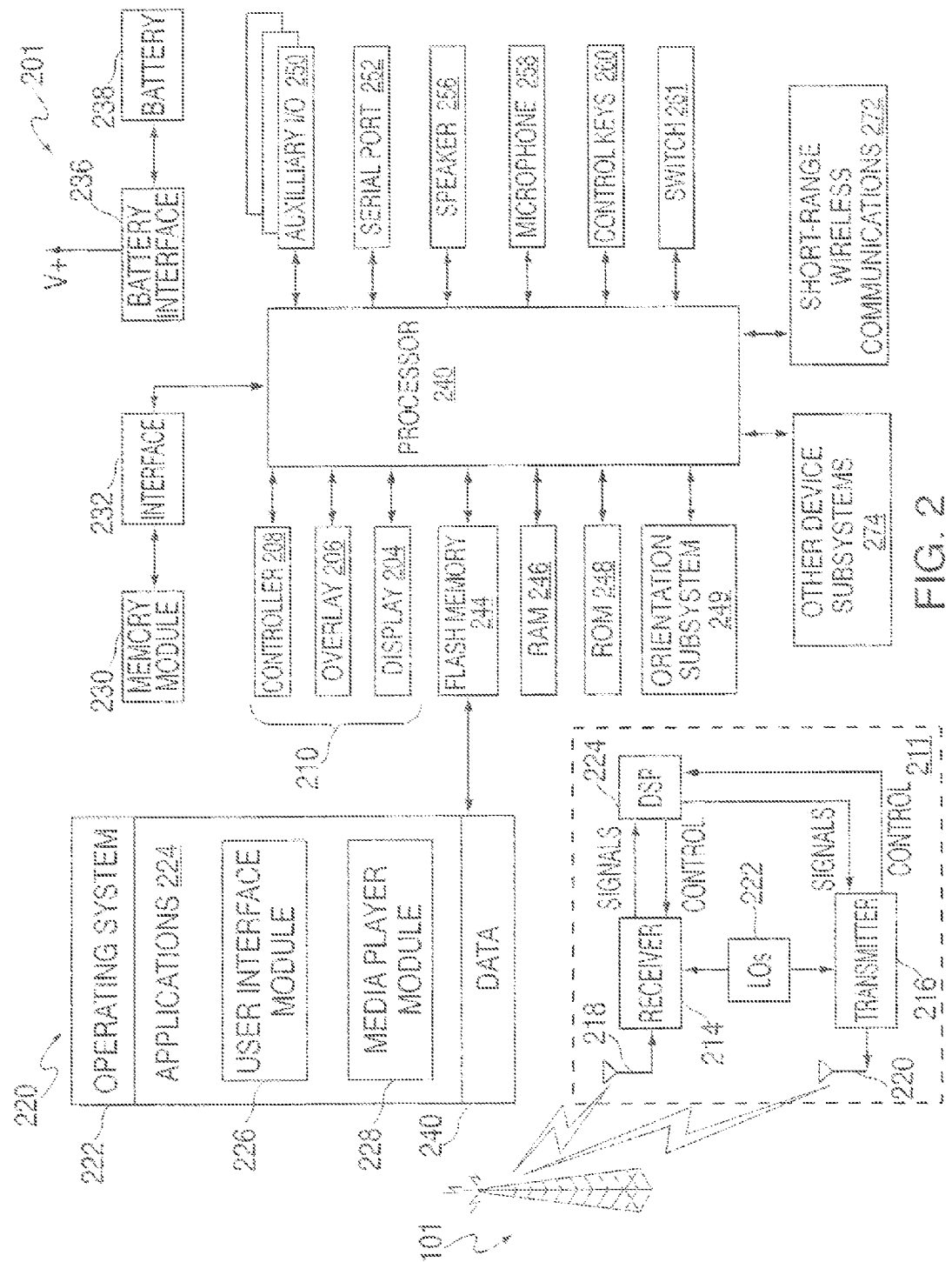
FIG. 2 is a block diagram illustrating a mobile communication device in accordance with one example embodiment of the present disclosure.

Reference is now made to FIG. 2, which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a controller comprising at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems including a display (screen) 204, such as a liquid crystal display (LCD) screen, with a touch-sensitive input surface or overlay 206 connected to an electronic controller 208 that together make up a touchscreen display 210. The touch-sensitive overlay 206 and the electronic controller 208 provide a touch-sensitive input device and the processor 240 interacts with the touch-sensitive overlay 206 via the electronic controller 208.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 222, and a processing module such as a digital signal processor (DSP) 224. The antenna elements 218 and 221 may be embedded or internal to the mobile communication device 201 and a single antenna may be shared by both receiver and transmitter, as is known in the art. As will be apparent to those skilled in the field of communication, the particular design of the wireless communication subsystem 221 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 221. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 220 stored in memory such as persistent memory, for example, in the flash memory 244. As illustrated in FIG. 2, the software modules 220 comprise operating system software 222, software applications 224 comprising a user interface module 226, and a media player module 228 for providing a media player application. The user interface module 226 renders and displays the GUI of the device 201 in accordance with instructions of the operating system 222 and applications 224 (as applicable).

The modules 226, 228 may, among other things, each be implemented through stand-alone software applications, or combined together in one or more of the operating system 222 and applications 224. In some example embodiments, the functions performed by each of the above identified modules 226, 228 may be realized as a plurality of independent elements, rather than a single integrated element, and any one or more of these elements may be implemented as parts of other software applications.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of applications, including, for example, an address book application, a messaging application (i.e., SMS, MMS), a calendar application, and/or a notepad application. In some embodiments, the software applications 224 include an email message application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application. As described further below with particular reference to illustrative embodiments, the applications (or modules) are so configured to enable enhanced messaging functionality from either an in-call or call log UI. Such programming can be implemented by those skilled in the art based on the teachings herein.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the mobile communication device 201 such as receipt of an electronic communication or incoming phone call, or for other purposes such as haptic feedback (touch feedback).

In some embodiments, the mobile communication device 201 also includes a removable memory card 230 (typically comprising flash memory) and a memory card interface 232. Network access typically associated with a subscriber or user of the mobile communication device 201 via the memory card 230, which may be a Subscriber Identity Nodule (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 240 in an erasable persistent memory, which in one example embodiment is the flash memory 244. In various embodiments, the data 240 includes service data comprising information required by the mobile communication device 201 to establish and maintain communication with the wireless network 101. The data 240 may also include user application data such as email messages, address book and contact information, calendar and schedule information, notepad documents, image flies, and other commonly stored user information stored on the mobile communication device 201 by its user, and other data. The data 240 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable or Bluetooth® connection to the host computer system for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 221 or software applications 224 may also be loaded onto the mobile communication device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 222. The telephony functions are provided by a combination of software/firmware (i.e., the voice communication module) and hardware (i.e., the microphone 222, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Figure 3:
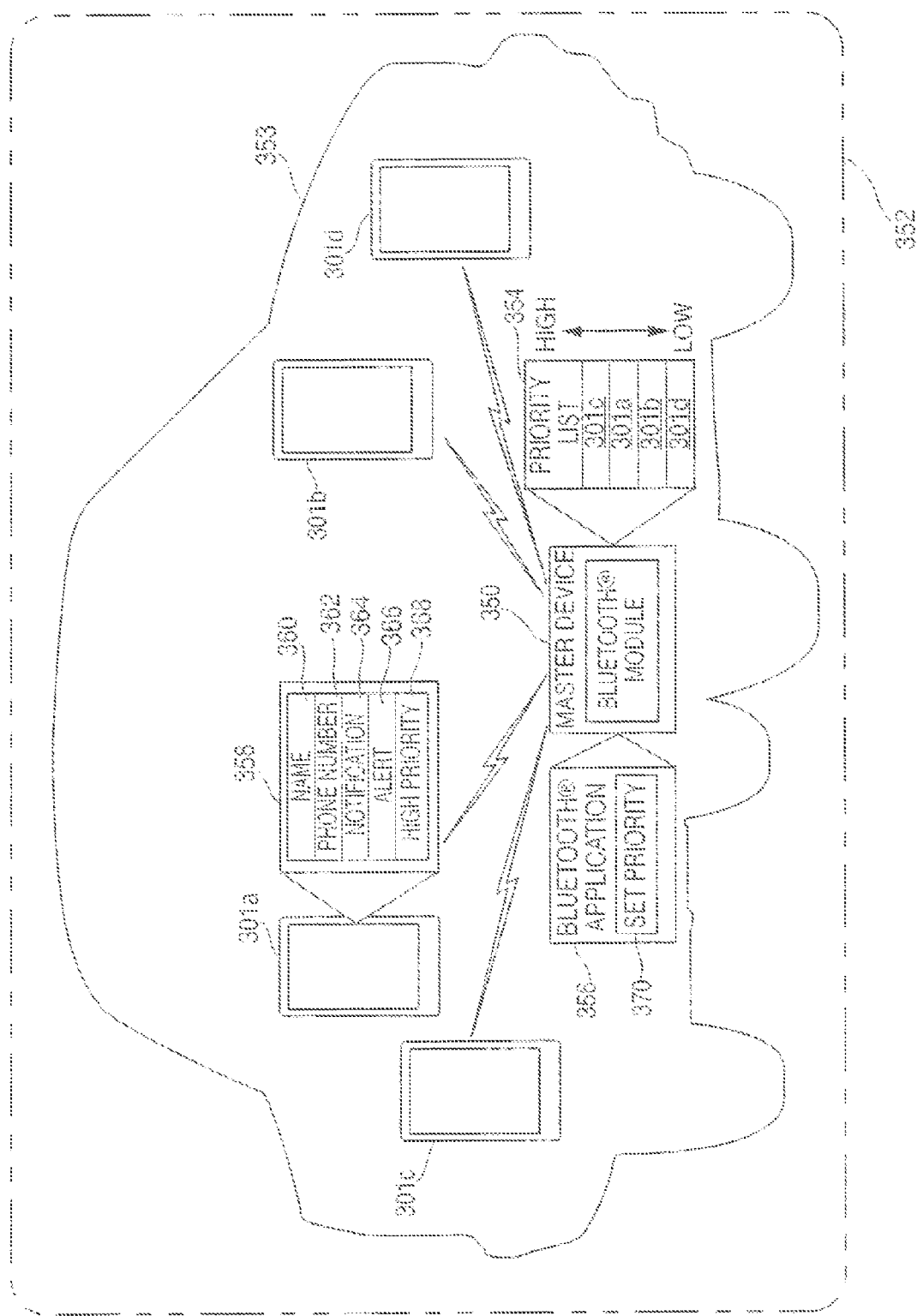
FIG. 3 is schematic diagram of an environment for carrying out aspects of the disclosure.

Referring now to FIG. 3, there are depicted a plurality of mobile communications devices (e.g., smartphones) generally characterized by the reference numerals 301*a*, 301*b*, 301*c* and 301*d* an exemplary environment in accordance with aspects of the disclosure. Each device 301 is Bluetooth® enabled and may be communicatively coupled to a master device 350 such as, for example, a vehicle Bluetooth® entertainment system or dedicated Bluetooth® communications device. When the devices 301*a-d* come within range (a boundary thereof shown generally at 352 of the master device 350, default pairing places the last paired device at the top of a priority list 354, in the exemplary case shown as device 301*c*. It will be appreciated by those skilled in the art that the master device 350 may request each device 301 to "handshake" therewith prior to initiating a negotiation. Thus, a security step may be implemented before negotiation takes place. An illustrative environment for implementing aspects of the present disclosure is shown as a vehicle generally denoted by the reference numeral 353. It should be understood that the boundary 352 (range) for the connection may vary depending on the respective transmission power of each device in the system and that the pairing request/negotiation may take place at a longer range than what is illustrated in the drawing. In accordance with an aspect of the disclosure, a priority override is established either by executing a Bluetooth® application 356 on the master device 350, or via a Bluetooth® application 358 running on the device 301. Furthermore, the master device 350 may be configured so as to dynamically change the priority of any slave device based on user-defined settings. Additionally, any structured object/device may be added in a conventional manner in addition to the exemplary devices shown and described herein. Unknown devices 301 may be dynamically added as new devices. As shown for device 301*a*, application 358 enables the user to set a pairing priority override based upon the user's name 360, phone number 362, a notification 364 (i.e., calendar/email/instant message trigger or the like), alert 366, or emergency/high-priority setting 368. Thus, if device 301*a* is set to raise its priority to the highest on the master device list 354 by virtue of one of these specified settings being triggered, the priority of device 301*a* will move to the number one rank and sequentially adjust the priority of the other devices 301*b*-301*d* downwardly, with device 301*c* in this instance moving to the number one rank, followed by c, b and d. By another approach, and as stated above, the Bluetooth® application 356 on the master device 350 can set the priority override for devices 301*a-d* through a Set Priority function 370 in a similar fashion. For example, if the user sets a high priority for emergency alerts, then any one of the devices 301 that receives an incoming emergency call, or an emergency alert, may have its priority raised to the highest. Moreover, a hierarchal arrangement may be set wherein a particular device 301 having an alert has a higher priority over another device receiving a simultaneous alert based upon additional conditions, such as a user ID or telephone number. In this regard, if the user set's "Tom's" device to a default higher priority in the event of an emergency over "Jim's" device, then Tom's will appear in the number one slot and his device will pair first. A user interface associated with the slave device 350 may be configured to enable the user to optionally select any one of the listed devices for immediate pairing if desired, thus overriding and/or bumping the currently paired device in the number one position to a lower priority. In this manner, the priority settings may be selected and assigned by either the sender or the recipient of respective calls. As each device 301 comes within proximity 352 of the master device 350, it may or may not immediately negotiate a connection. However, when a pairing priority request is received, such as for example, a phone call, the device 301 initiates a connection request with the master device 350 to override the existing priority pairing(s). It will be appreciated by those skilled in the art, that although shown and described herein with respect to Bluetooth®, a variety of short-range mobile communications standards may be employed to implement the functionality and advantages of the present disclosure.

Figure 4:
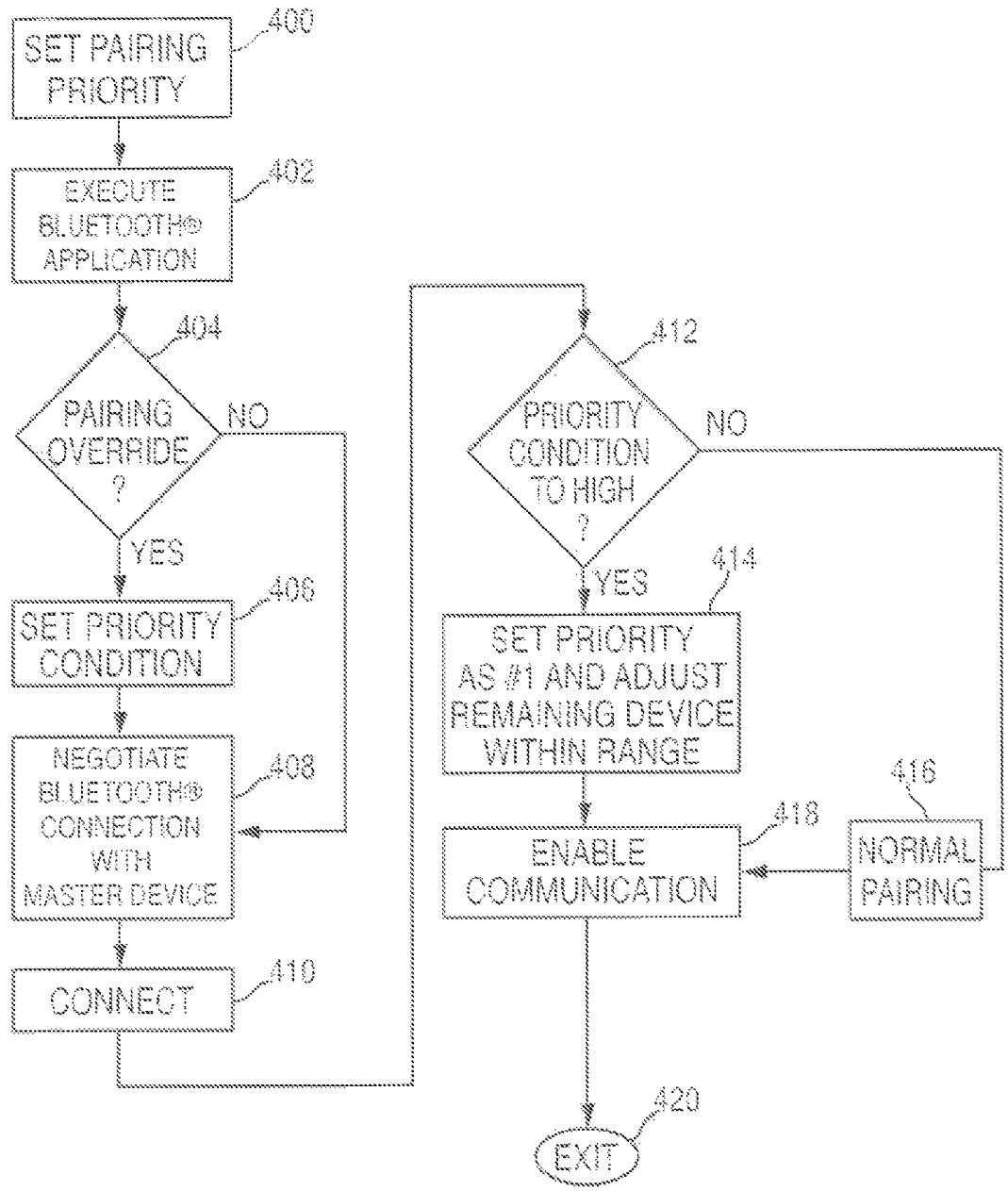
FIG. 4 is a flow diagram of a process in accordance with an aspect of the disclosure.

FIG. 4 is a flow-diagram of an illustrative process 400 for setting short range pairing priority in accordance with aspects of the disclosure. At block 402, a user selects and runs a Bluetooth® application 402 on a device communicating with another master device. The Bluetooth® application 402 is used to set up the connection with the master, including setting an override priority as described above. If a pairing override is received by the master at 404, then a priority condition for that device is established and set at block 406. A Bluetooth® connection is thereafter negotiated at block 408 in a conventional manner and a connection set at block 410. If a pairing override is not established, then a normal connection for that device is negotiated at block 408 for so long as there is no other competing device with a higher priority. At block 412, if the priority condition is set to "high," the master device sets the priority for that device to #1, even if there is another device in the #1 pairing slot (rank), and the remaining device(s) are adjusted downwardly in rank as discussed above. It the priority condition is not set to high and there are no other devices, then the process proceeds to block 416 and a normal pairing between the device negotiating the request and the master is implemented. Communications are then enabled between the device and the master at block 418 in a conventional manner, and the process terminates at block 420. Although shown from the perspective of the slave device, the pairing override in block 404 may be implemented by the master device as shown in FIG. 3 and described in the foregoing. By another approach and as discussed above, the master device enables pairing priorities to be established by the user for new devices that come within range of the short range communications capability of the master device. So configured, the master device running the application at block 402 may render an option for the user via a user interface (not shown) to add the new device which is identified in a conventional manner. Prior to negotiating the connection at block 408, the master device runs a security step to handshake with the new device. The process proceeds in the same manner with the master device resolving pairing conflicts in accordance with the aspects of the disclosure described above. In block 412, resolution of simultaneous high-alerts from more than one slave device, each with a high priority request, is obtained by either direct user input via the user interface, or based upon predefined user settings as set forth above (i.e., telephone number, caller identification, alert type, or any trigger set by the user).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method by a slave device connected to a master device over a short-range wireless connection for overriding a pairing priority at the master device, comprising:

executing an application at the slave device that sets a pairing connection priority override, the pairing connection priority override configuring the slave device to raise a connection priority of the slave device to a highest priority at the master device;

receiving one or more pairing connection priority override parameters from a user of the slave device, the one or more pairing connection priority override parameters identifying at least one condition to be satisfied for performing the pairing connection priority override;

negotiating a connection with the master device and sending the pairing priority override and the one or more pairing connection priority override parameters to the master device, the pairing priority override indicating to the master device that the slave device is requesting to override any pairing priority currently established at the master device;

if the pairing connection priority override is higher than an existing priority, completing the connection with the master device; and if the pairing connection pairing priority override is not higher than the existing priority, negotiating the connection with the master device.

2. The method of claim 1, wherein the short-range wireless connection is a Bluetooth® standard protocol.

3. The method of claim 1, wherein the connection pairing priority override is based on at least one of a phone number, user identifier, alert, notification, and message.

4. The method of claim 1, wherein the connection pairing priority override is established by setting the priority override on the slave device.

5. The method of claim 1, wherein the connection pairing priority override is established by setting the priority override on the master device.

6. The method of claim 1, wherein the master device contains a listing of recently paired slave devices in a priority list and the priority list is dynamically adjusted based on receipt of a priority pairing request from a slave device among the priority of recently paired slave devices.

7. The method of claim 6, wherein the highest priority of a slave device is based on a user preference set on the master device.

8. An electronic device, comprising:

at least one processor and communications module configured for establishing short-range wireless communications with a master device, the processor configured to execute an application for overriding a pairing priority established at the master device by:

executing an application at the electronic device that sets a connection pairing priority override, the pairing connection priority override configuring the electronic device to raise a connection priority of the electronic device to a highest priority at the master device;

receiving one or more pairing connection priority override parameters from a user of the electronic device, the one or more pairing connection priority override parameters identifying at least one condition to be satisfied for performing the pairing connection priority override;

negotiating a connection with the master device and sending the pairing priority override and the one or more pairing connection priority override parameters to the master device, the pairing priority override indicating to the master device that the electronic device is requesting to override any pairing priority currently established at the master device;

if the pairing connection pairing priority override is higher than an existing priority, completing the connection with the master device; and if the pairing connection pairing priority override is not higher than the existing priority, negotiating the connection with the master device.

9. The electronic device of claim 8, wherein the short-range wireless connection is a Bluetooth® standard protocol.

10. The electronic device of claim 8, wherein the connection pairing priority override is based on at least one of a phone number, user identifier, alert, notification, and message.

11. The electronic device of claim 8, wherein the connection pairing priority override is established by setting the priority override on the electronic device.

12. The electronic device of claim 8, wherein the connection pairing priority override is established by setting the connection pairing priority override on the master device.

13. The electronic device of claim 8, wherein the master device contains a listing of recently paired electronic devices in a priority list and the priority list is dynamically adjusted based on receipt of a priority pairing request from an electronic device among the priority of recently paired electronic devices.

14. The electronic device of claim 8, wherein the highest priority of an electronic device among the recently paired electronic devices is based on a user preference set on the master device.

15. A method by a master device for setting a pairing priority override for a slave device coupled to the master device over a short-range wireless connection, comprising:

negotiating a connection with the slave device;

receiving a pairing override from the slave device, the pairing override comprising one or more pairing override parameters defined by a user of the slave device, the one or more pairing override parameters identifying at least one condition to be satisfied for performing the pairing override, and the pairing override indicating to the master device that the slave device is requesting to override any pairing priority currently established at the master device; and determining a pairing priority for the slave device in response to the pairing override with the pairing override parameters and further in response to a user identifier of the slave device;

if the determined pairing priority for the slave device is higher than any existing priority in a listing of recently paired slaved devices in a priority list of recently paired slaved devices, dynamically adjusting the priority list dependent upon the determined pairing priority and completing the connection with the slave device; and if the priority for the slave device is not higher than any existing priority, negotiating the connection with the slave device without dynamic adjusting the priority list.

16. The method of claim 15, further comprising adjusting the priority of the at least one other slave device.

17. The method of claim 15, further comprising presenting an option to add the new slave device for user selection.

18. The method of claim 17, wherein the option includes highlighting the new device.

19. The method of claim 15, further comprising a handshake prior to the negotiation.

20. The method of claim 15, further comprising setting priority for the slave device relative to the at least one other slave device when high priority requests are simultaneously received at the master device, the highest priority being assigned based on user defined settings.

21. An electronic device, comprising:

at least one processor and communications module configured for establishing short-range wireless communications with at least one slave device, the processor configured to execute an application for connecting to the at least one slave device by:

negotiating a connection;

receiving a pairing override from the at least one slave device, the pairing override comprising one or more pairing override parameters defined by a user of the slave device, the one or more pairing override parameters identifying at least one condition to be satisfied for performing the pairing override, and the pairing override indicating to the master device that the slave device is requesting to override any pairing priority currently established at the electronic device; and determining a pairing priority for the at least one slave device in response to the pairing override with the pairing override parameters and further in response to a user identifier of the at least one slave device;

if the determined pairing priority for the at least one slave device is higher than any existing priority in a listing of recently paired slaved devices in a priority list of recently paired slaved devices, dynamically adjusting the priority list dependent upon the determined pairing priority and completing the connection with the at least one slave device; and if the priority for the at least one slave device is not higher than any existing priority, negotiating the connection with the at least one slave device without dynamic adjusting the priority list.

22. The electronic device of claim 21, further comprising adjusting the priority of the at least one other slave device.

23. The electronic device of claim 21, further comprising presenting an option to add the new slave device for user selection.

24. The electronic device of claim 21, further comprising executing a handshake prior to the negotiation.

25. The electronic device of claim 21, further comprising setting priority for the at least one slave device relative to the at least one other slave device at the electronic device when high priority requests are simultaneously received at the electronic device, the highest priority being assigned based on user defined settings.

* * * * *